United States Patent [19]

Schisselbauer

[11] 4,284,883
[45] Aug. 18, 1981

[54] CARD READER WITH IMPROVED DATA PROCESSING TIMING CONTROL

[75] Inventor: John C. Schisselbauer, Southampton, Pa.

[73] Assignee: Peripheral Dynamics, Inc., Norristown, Pa.

[21] Appl. No.: 41,897

[22] Filed: May 23, 1979

[51] Int. Cl.³ .................... G06K 7/016; G06K 7/00
[52] U.S. Cl. ........................... 235/474 Q; 235/436
[58] Field of Search ............ 235/435, 375, 379, 380, 235/381, 382, 466, 436, 474; 340/149 A; 250/568; 360/2

[56] References Cited

U.S. PATENT DOCUMENTS

| | | | |
|---|---|---|---|
| 3,700,861 | 10/1972 | Heyden et al. | 235/474 |
| 3,956,615 | 5/1976 | Anderson | 235/379 |
| 3,995,255 | 11/1976 | Cuttill | 340/149 A |
| 4,063,070 | 12/1977 | Delarue et al. | 235/474 |
| 4,085,313 | 4/1978 | Van Ness | 235/381 |

Primary Examiner—Daryl W. Cook
Attorney, Agent, or Firm—Woodcock, Washburn, Kurtz, Mackiewicz & Norris

[57] ABSTRACT

A badge reader adapted to communicate with remotely located data processing equipment, said badge reader having data processing circuitry controlled by a rate clock which in turn is enabled and disabled by internal and external signals to provide clock signals only when and as required for carrying out selected data processing operations.

6 Claims, 7 Drawing Figures

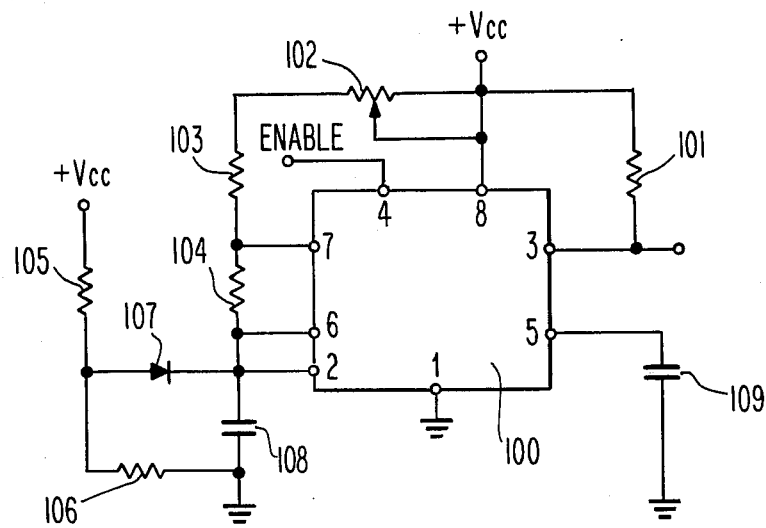
Fig. 2
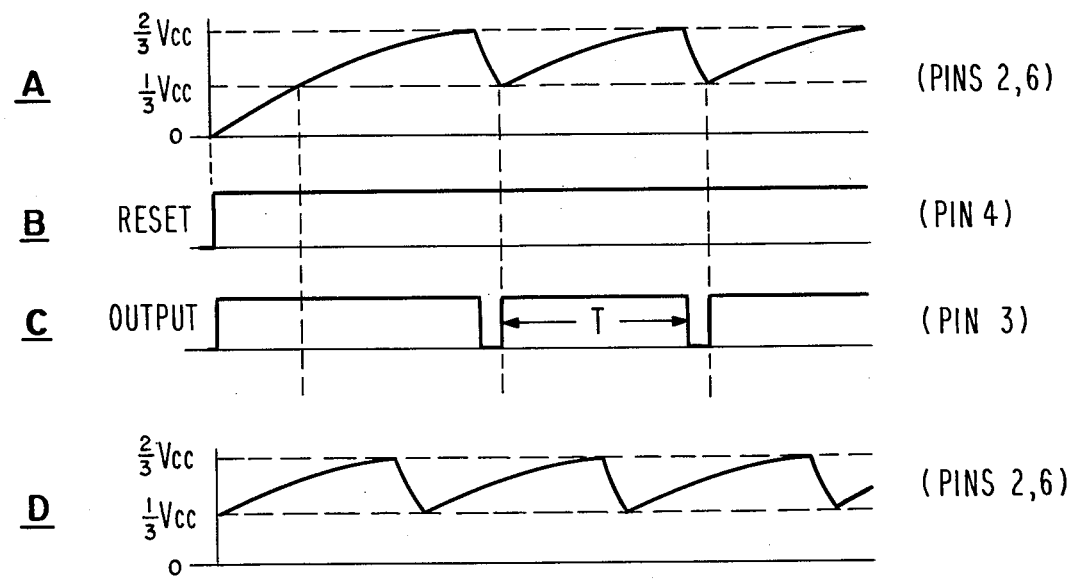
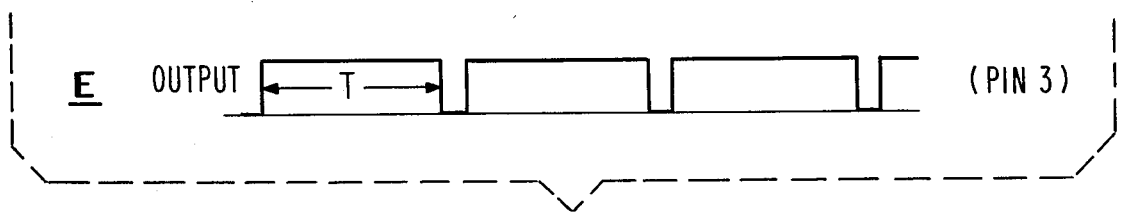
Fig. 3

CARD READER WITH IMPROVED DATA PROCESSING TIMING CONTROL

CROSS-REFERENCE TO RELATED APPLICATION

Reference is made to pending U.S. application Ser No. 920,283, now issued as U.S. Pat. No. 4,187,980, Badge Reader With Reliable Data Clocking Means, filed June 29, 1978, invention of John C. Schisselbauer, John S. Garczynski, Richard J. Auchinleck, and Henry J. Lo Furno. U.S. Pat. No. 4,187,980, which is incorporated here by reference, discloses and claims other features of the same card reader system as the subject application.

BACKGROUND OF THE INVENTION

This invention lies in the field of badge and document reading devices and, more particularly, devices for reading encoded data and communicating with other remote electronic data processing apparatus.

The rapidly expanding data processing technology has forced the development of many new modes of data collection. One such method which is currently increasing and has a large potential for industrial application is that of collecting data from badges or the like which are carried by individuals. In many industrial systems, activity records and other events are monitored by having individuals at predetermined locations insert badges into readers to record specified events, which badges are designed to be encoded so as to permit reliable data recognition. The types of such badges are standardized, and for each such type a predetermined amount of information in a given format is available. The badge reader may have a motorized transport system or, as in many cases where it is either impractical or undesirable to have such a motorized transport system within a small reader the person who carries the badge inserts it manually and then withdraws it after the reader performs the reading operation.

The reader having obtained the desired information from the badge or other document, the following task is to communicate such information in a desired form to a central computer or other remote piece of equipment within an overall data processing system. For the reader disclosed herein, data transfer as such is essentially one-way, the data which has been read from the badge or other document being transmitted to the remote location. However, overall communication must be two-way, since the computer must send certain logic signals to the card reader for control thereof, meaning that the card reader must be adapted to receive and process given messages from the external location. Control of transmission from the reader to the remote location, and of reception of messages from the remote location by the reader, is organized around a clock generator, which establishes the basic timing for data processing within the reader and for controlling transmission in either direction. In systems of this sort, two general approaches are available, namely (1) keep the basic clock generator going at all times and gate clock signals as desired or (2) enable the clock generator only when desired. The second approach presents the opportunity to substantially simplify gating circuitry, but requires a highly accurate means of turn-on and turn-off of the basic clock generator, in order to achieve the precise timing which is required every time the clock is turned on. The timing control circuitry disclosed and claimed herein provides a reliable on-off control of the clock generator and corresponding control of the transmit-receive operations of the badge reader.

SUMMARY OF THE INVENTION

It is an object of this invention to provide a badge reader of flexible design, having control circuitry for controlling the processing of data within the reader and for controlling communication with an external remotely located apparatus, the control being organized around a clock generator which is enabled and disabled during the time periods when such operations are carried out.

It is another object of this invention to provide a badge reader adapted to communicate with remotely located data processing equipment, said badge reader having data processing circuitry controlled by a rate clock which in turn is enabled and disabled by internal and external signals to provide clock signals only when and as required for carrying out selected data processing operations.

It is another object of this invention to provide a timing circuit for providing timing control (clock) signals, said timing circuit being adapted to be turned on and off without adverse transient start up effects.

In accordance with the above objects, there is provided badge reading apparatus for reading data-encoded badges, having means for controlling processing of such read data, such processing including transmitting data to a remote location, said control means having a unique timing circuit adapted to be turned on and off corresponding to the time periods when data processing operations are carried out.

BRIEF DESCRIPTION OF THE DRAWINGS

FIG. 2 is a schematic circuit diagram of the timer utilized in the control circuit of this invention.

FIGS. 3A-3C are graphs of wave forms showing signals at selected pins of the unimproved integrated circuit 100 of FIG. 2;

FIGS. 3D and 3E are corresponding wave forms for the improved circuit of FIG. 2.

DESCRIPTION OF THE PREFERRED EMBODIMENTS

Figure 1:
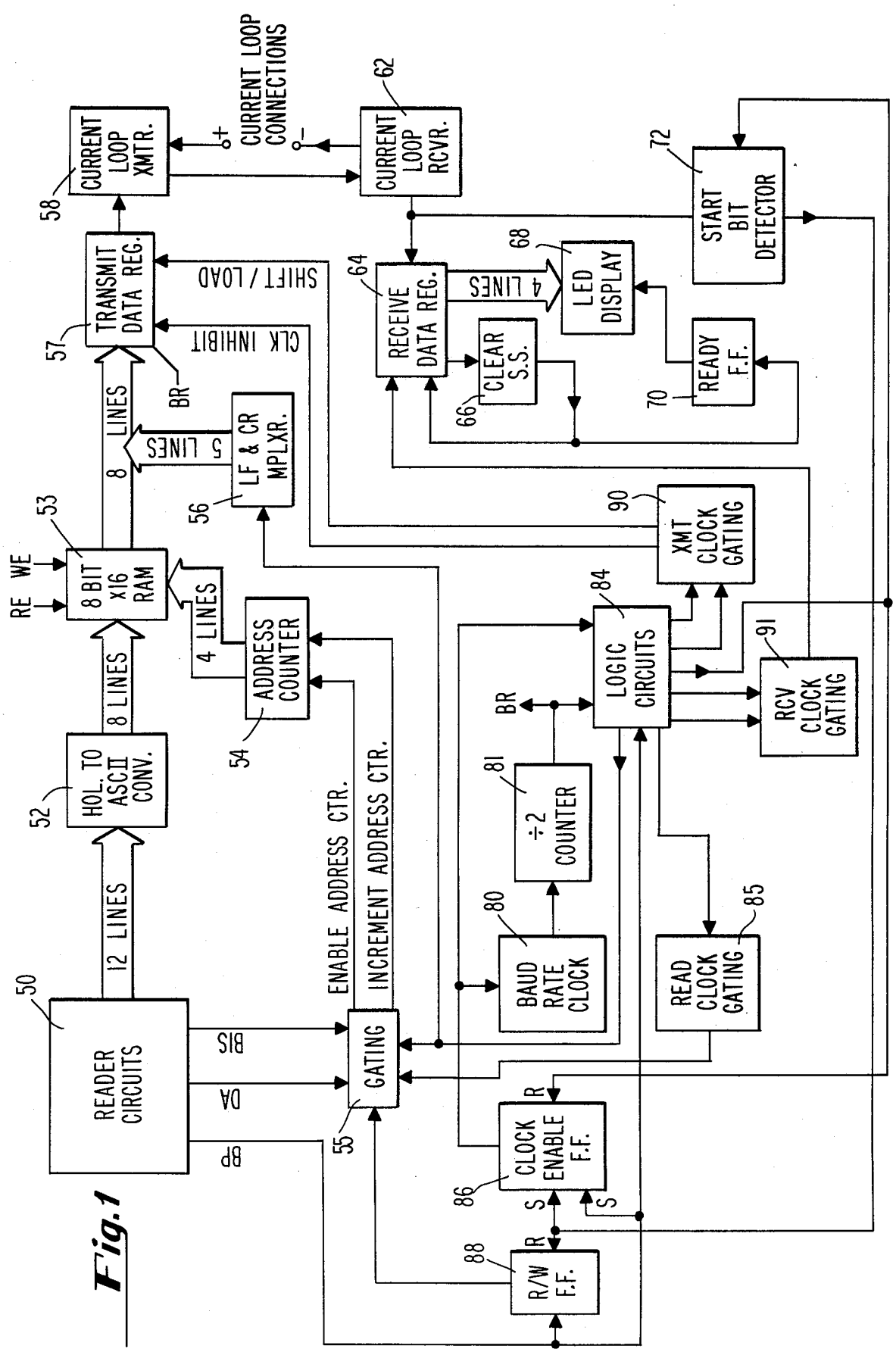
FIG. 1 is a block diagram of the data control circuitry of the badge reader of this invention.

Referring now to FIG. 1, there is shown a block diagram of the overall control circuitry as used in the reader of this invention. The transport means for receiving and transporting a badge or card, not shown, is as illustrated in the referenced copending application. The block 50 designated "reader circuits" is disclosed in detail in such copending application. Thus, the starting point for this specification is that a badge or the like has been read, and encoded data is made available in 12 bit words, 12 bit words being generated for each column of data that has been read. The 12 lines indicated as being coupled to block 52 carry the 12 bit words in parallel form. The reader circuits 50 also provide 3 control signals, as follows: the BIS (badge in station) signal, which is an enable signal that is generated from the time the slider first starts to move until it bottoms in the reader, i.e., the period of time when the badge is being moved through the reader and being read; the DA (data available) signal which is generated for each column as it is read; and the BP (badge presence) signal which indicates that the badge has been bottomed in the reader, i.e., it has been read. These three signals are shown coming out of the bottom of block 50 and are used in the control circuitry.

In the discussion that follows, it is assumed that a type three plastic badge is utilized.

The type 3 badge has Hollerith punching in a 12 row format, with up to 21 columns. The following description, for illustrative purposes, assumes the use of 15 columns. It is to be noted that other types of badges with other data formats, as well as other types of data documents, can also be used with this invention. As used herein, the term "badge reader" means a device capable of reading badges or other documents.

During the badge reading cycle, the 15 columns of Hollerith encoded parallel data from the reader circuit 50 are taken a column at a time as they are read and converted in block 52 into 8-bit ASCII characters which are then coupled through parallel lines into the random access memory (RAM) 53. The RAM 53 has read enable (RE) and write enable (WE) terminals indicated in FIG. 1, to control the writing and reading operations of the memory. Information is either stored into or read from the particular address which is represented by the 4-bit address on the 4 lines coming from address counter 54. As the badge is being read, the address counter is incremented corresponding to each column of data and the new information is written into each corresponding RAM address. When the badge has been fully read, the contents of the memory are successively read out and parallel transferred to transmit data register 57, from which the 8-bits of each data word are clocked out serially, together with start /and stop bits, through current loop transmitter 58 to the external computer or other remote device. Note also that a multiplexer 56 is utilized to insert a line feed (LF) character before the transmission of data and a carriage return (CR) character after transmission. The exact technique for controlling the timing of this data processing is explained in the discussion below.

For receiving transmission from the remote location, there is shown a current loop receiver 62, which couples inputted data to the receive data register 64. After transmission of badge data, the circuits are placed in receive mode by logic circuits 84 and a start bit is transmitted from the computer and detected by receiver 62. The start bit is connected to detector 72 which in turn produces an output which is connected to clock enable flip-flop 86. This sets flip-flop 86, the output of which starts clock 80. The resulting BR signal clocks the transmitted serial word from receiver 62 into receive data register 64. This register is a serial-in parallel-out type device, four outputs of which operate LED display 68, and one output of which is connected to CLEAR single shot 66. When the received character, having a predetermined bit length, has been clocked into register 64, a signal is generated by logic circuits 84 which resets flip-flop 86, thus stopping the clock. Detector 72 is also reset.

Depending upon the character which has been received, a combination of 4 LEDS may be lighted to indicate a message from the computer. If the computer has transmitted a "clear"code, an output is coupled to the clear single shot 66. The output of this single shot clears the reader circuitry and sets ready flip-flop 70, which in turn lights another LED in display 68 to indicate that the unit is ready to read the next badge. If the reader is not placed in ready condition, a subsequent reading of badges is inhibited by circuitry not illustrated. Thus, the transmission from the computer is utilized to maintain positive control over the system. In practice, any number of display codes may be transmitted in succession before transmission of a clear code.

The heart of the control circuitry is the clock 80 which is enabled when and only when clock enable flip-flop 86 is in a set condition. This is done, for example, when the BP signal goes high indicating that the badge has been read, thus setting flip-flops 88 and 86. Also, flip-flop 86 is set, as previously stated, when a start bit is sensed at the start bit detector 72. Flip-flop 86 is reset by a signal delivered to its reset terminal, as happens following completion of data transmission or reception, at which time a reset signal is coupled from logic circuits 84. The output of clock generator 80 is passed through counter 81 which is a divide-by-two counter, to generate BR signals. These are inputted to the transmit data register 57, as well as to circuits 84. The logic circuits 84 provide a variety of functions, mostly counting functions for determining the proper sequencing of the various transmit and receive operations. The logic circuits provide outputs to transmit clock gating block 90, for generating signals which are connected to transmit data register 57. Logic circuits 84 also provide outputs to receive clock gating block 91, for generating signals which are transmitted to receive data register 64. Additionally, logic circuits 84 generate signals which are inputted to gating circuit 55 for control of address counter 54, and to multiplexer 56 for control of multiplexing the line feed and carriage return signals into the transmit data register 57. Note also that the BP signal is inputted to logic circuits 84 and to the read write flip- flop 88. The output of flip-flop 88 is connected to gating circuit 55 as well as to memory 53 (by connections not shown, to RE and WE) to control respective read and write operations.

It is to be noted that not all connections of the control circuitry are shown, such as for resetting various flip-flops, these being a matter of proper engineering design and not necessary to illustrate the invention as claimed. Also, it is understood that the operations carried on in logic circuits 84 are a matter of design choice which are accomplished by conventional logic circuits, and can be varied to accomplish different data processing operations. However, in all cases, the actual operations are ultimately controlled by clock generator 80. Thus, as data is received from the computer, the clock signals are used as the basic timing control signals to generate receive clock gating signals which clock data into the receive data register. Likewise, the BR signals are used to clock data into the transmit data register and to control the timing of the line feed and carriage return characters, during the transmit operation. The clock 80 is enabled only during these operations, and is disabled when processing operations are not being carried out.

Referring now to FIG. 2, there is shown a circuit diagram of the preferred embodiment of clock generator 80. Block 100 is preferably a model 555 chip such as made by National Semiconductor or Signetics Corp. The numerals 1–8 represent connector pins on the chip. Power, designated Vcc is connected to pin 8, while the output is taken at pin 3. Pin 1 is connected directly to ground, and pin 5 is connected to ground through capacitor 109. Output pin 3 is connected to the power supply through resistor 101. Variable resistor 102 and resistor 103 are connected between power supply and pin 7, and resistor 104 is connected between pin 7 and the common connection of pins 2 and 6. Pin 2 is connected through capacitor 108 to ground. A clamping circuit comprised of resistor 105, resistor 106 and diode 107 is provided to hold the voltage at pin 2 at ⅓ of the power supply (⅓ Vcc) when the timer is not enabled. The enable signal is connected from enable flip-flop 86 at pin 4.

In practice, without the clamping circuit 105, 106, 107, the circuit operates as shown in FIGS. 3A through 3C. Resistors 102, 103, and 104 in combination with capacitor 108, in cooperation with the characteristic of the chip itself, determine the frequency of the output signal. The timer frequency is about 220 Hz for capacitor 108 having a value of 0.05 microfarads, resistor 103 having a value of 56K, resistor 104 having a value of 33K, and resistor 102 being a variable within the range of 0 to 50K.

At start up, which is when an enable signal is delivered at pin 4, capacitor 108 must charge as shown in the curve of FIG. 3A. Thus, the very first time period is longer than successive time periods (T) since each cycle is triggered when the voltage across capacitor 108 has dropped to ⅓ of full source voltage. As seen in FIGS. 3B and 3C, the output goes high with the reset (enable) signal, and an output pulse occurs corresponding to the period of discharge of capacitor 108. However, with the clamping circuit in combination with the chip, the time period (T) from the moment of first enabling the timer to the first output pulse is the same as the steady state time period, due to the fact that the voltage across capacitor 108 is clamped at ⅓ of the source supply during times when the timer is not running. Thus, the timer is freely enabled and disabled, without sacrificing the accuracy of the timing signal each time the timer is enabled.

Referring back to FIG. 1, the importance of the improved timing circuit in the overall control circuitry can be appreciated. By way of illustration, when data is sent from the computer to the reader, the data necessarily comes with a predetermined time relationship. The first bit which is detected in receiver 62 is recognized by the start bit detector, which sets the clock enable flip-flop 86, thereby enabling starting of clock 80. The following bits, which are received serially, come in a predetermined time sequence and must be clocked into the received data register 64 in proper time relationship. This is achieved only when and if clock generator 80 generates clock signals which are in the desired fixed time relationship with respect to the start bit, which means that the time period of the first cycle generated by the clock must be very accurate.

There has thus been disclosed a badge reader having control circuitry for performing a plurality of processing functions on data which has been read from a badge or other form of document having encoded information thereon. The reader control circuit relies upon a clock generator for generating basic timing control signals, which clock generator is enabled to deliver clock pulses when and only when predetermined operations are signaled for. The clock generator is controlled to commence accurately in a predetermined time relationship with signals communicating that a selected operation is to be performed.

What is claimed is:

1. A badge reader adapted to carry out operations with a device at a remote location comprising means for reading data from a badge, means for storing said read data, operation means for carrying out selected operations with said remote location device including means for transmitting stored data to a remote location and means for receiving data from said remote location, control means for generating operation signals for initiating said selected operations and for generating control signals for controlling said operation means, characterized by said control means including a timing signal generator which controls the timing of said control signals, and timing signal control means for receiving signals from said remote location and for enabling said timing signal generator only while one of said selected operations is being carried out.

2. The badge reader as described in claim 1, wherein said timing signal control means comprises means for
   (a) enabling said timing signal generator to run at a frequency corresponding to a predetermined time period, and
   (b) for disabling said timing signal generator from running.

3. The badge reader as described in claim 2, wherein said timing signal generator comprises means for operating with said predetermined time period for the first cycle after being enabled.

4. The badge reader as described in claim 3, wherein said receive means comprises means for detecting a start signal received from said remote location, and said timing signal control means comprises means to enable said timing signal generator so that it completes a first cycle in said predetermined time period.

5. In a badge reader adapted to read badges and the like, and to transmit data to an external device and receive signals from an external source, a control circuit for controlling said transmit and receive operations, said control circuit being characterized by having (a) a timing circuit for generating clock pulses, said timing circuit having a capacitor for setting the rate of said clock pulses, and (b) a clamping circuit for clamping the voltage across said capacitor at a predetermined minimum value, whereby whenever said timing circuit is started the first cycle is of the same time period as the steady state time period, said control circuit further having timer enable means for enabling operation of said timing circuit, and said badge reader has operation signal means for controlling said timer enable means so that it enables said timing circuit only during predetermined reader operations.

6. The reader as described in claim 5, wherein said control circuit comprises receive means for detecting a start signal received from said external source, and timing circuit control means for enabling said timing circuit in response to a received start signal.

* * * * *